United States Patent

Brunner et al.

[11] Patent Number: 5,950,951
[45] Date of Patent: *Sep. 14, 1999

[54] DEVICE FOR POSITIONING THE SPOOL OF A CARTRIDGE FOR A PHOTOGRAPHIC FILM

[75] Inventors: Juergen Brunner; Reinhart Wuerfel, both of Munich; Guenter Doemges, Oberhaching, all of Germany

[73] Assignee: Agfa-Gevaert Aktiengesellschaft, Leverkusen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/738,675

[22] Filed: Oct. 25, 1996

[30] Foreign Application Priority Data

Oct. 25, 1995 [DE] Germany ................ 195 39 721

[51] Int. Cl.⁶ .................. G03B 23/02; B65H 18/08; B65H 26/00
[52] U.S. Cl. ................ 242/348.1; 242/348.3; 242/357; 242/534; 242/563
[58] Field of Search ............ 242/348.1, 348.3, 242/332.8, 532.6, 357, 534, 563

[56] References Cited

U.S. PATENT DOCUMENTS

| 4,695,005 | 9/1987 | Gietman, Jr. ............ 242/532.6 X |
| 5,301,892 | 4/1994 | Merz et al. ............ 242/532.6 X |

FOREIGN PATENT DOCUMENTS 0636924  2/1995  European Pat. Off. .

*Primary Examiner*—John Q. Nguyen
*Attorney, Agent, or Firm*—Milde, Hoffberg & Macklin, LLP

[57] ABSTRACT

A device for positioning the spool of a cartridge for a roll of photographic film. The film is provided with holes, at its end, that interact with catches attached to the spool. Detachment from, or attachment to, the spool, is only possible at a particular orientation of the spool. A shaft is provided which can be interlockingly connected with the spool in a predetermined orientation. A guide block is displaceable, being operative, directly or indirectly, for contacting with the shaft. It reorients the shaft to the desired position during displacement so that the film can be detached from the spool or attached to the spool.

18 Claims, 3 Drawing Sheets

DEVICE FOR POSITIONING THE SPOOL OF A CARTRIDGE FOR A PHOTOGRAPHIC FILM

FIELD OF THE INVENTION

The present invention relates to a device for positioning the spool of a cartridge for a roll of photographic film, the film being provided at its end with holes that interact with a catch attached to the spool, whereby the detachment from or the attachment to the spool is possible only in a particular spool position.

BACKGROUND OF THE INVENTION

In processing photographic films in a large laboratory, the films are removed from the film cartridges in a so-called splicer and glued together into a long strip. In this case, the rear end of each film and the front end of the following film must be positioned at a splicing station in such a way that the ends can be joined by a splicing label. An example of a device of this type is described in, for example, EP-OS 0,212,134.

In devices of this known type, the film cartridges are destroyed in removing the film. The cartridge scraps are collected in a container and disposed of as waste.

In U.S. Pat. No. 5,093,686 a system is described in which the cartridges may be saved, and do not have to be destroyed when the film is initially removed for processing. Following developing and copying, the film is wound back into the cartridge and delivered to the customer with the finished prints of the pictures. As a result of this, the empty cartridges must be removed from the splicer and maintained in a defined order, so that later they can again be matched up with the individual films, for reinsertion.

In the film setup of U.S. Pat. No. 5,093,686, the end of the film is detached from the film spool using a special tool, as is described in EP-OS 0,636,924. This permits the film to be removed completely from the cartridge.

After paper prints are developed and printed, the film is then reattached by a special tool to the catches or hooks of the spool, and coiled into the cartridge. A device for coiling and uncoiling the film, as well as for detaching and attaching the film onto the spool is described in EP-OS 0,582,852.

It has been found that both for detaching the film from the spool and for attaching the film to the spool, a very precise predetermined spool placement must be provided.

SUMMARY AND OBJECTS OF THE INVENTION

The present invention therefore provides, using simple means, a device for positioning the spool that ensures the required precision both for detaching the film from the spool and for attaching the film to the spool.

The present invention provides a device for positioning the spool of a photographic film cartridge, the film being provided at its end with holes that interact with a catch on the spool, whereby the detachment from or the attachment to the spool is possible only in a particular spool orientation, wherein a shaft is provided that can be connected in interlocking fashion with the spool, and a member provided with a displaceable guide block so that the member comes into operative connection, directly or indirectly, with the shaft, and brings the shaft into a position in which the film can be removed from the spool or attached to the spool.

According to one embodiment, a guide block is provided which interacts with an eccentrically located guiding pin connected to the shaft. If the block moves perpendicular to the spool, and the spool is not yet positioned correctly, then the guiding pin is contacted and shifted by the block, with the shaft being correspondingly turned to a desired orientation by a torque produced by the contact force of the block on the eccentrically located guiding pin acting on the shaft. The precision of positioning of the spool in this arrangement is further improved if the guiding pin itself is supported so as to rotate. A further embodiment of the invention provides a concavity in the middle of the guide block. The shape of this concavity matches the exterior contour of the guiding pin. The pin engages within this concavity as soon as the shaft has reached its correct position, and thus is secured in this position.

A similarly exact positioning can be attained by using two guide pins placed at a predetermined interval, or one guiding member with an appropriately elongated straight edge.

Sometimes the guide block cannot be directly attached onto the edge of the shaft, because, for example, the shaft is still not connected to a drive. In this case, it is advantageous to use a fork-shaped element with a deep recess. In one embodiment of a guide block having a shape adapted with this configuration, the shaft is provided with two opposed flattened surfaces. It is over these flattened surfaces that the recess of the forked guide block element can be slid. However, in this example, a correction of the spool orientation is possible only in a small angular range.

If the fork-shaped guide block element is used when correction for a larger angular range is necessary, it is particularly advantageous to use an eccentrically placed guiding pin on the shaft. Using this eccentric guiding pin embodiment, orientation errors of the spool can be corrected to almost±135° from the desired orientation.

Prior to actuation of the guide block element, however, the spool may have reached an orientation that is in the non-correctable 90° area. If this is the case, then the spool is repositioned to an orientation which differs by 180° from the intended orientation by the action of the displacement of the guide block. However, this potential error can be detected simply. This is because in this spool position, the limit setting of the block element clearly differs from the limit setting which the block element possesses if the spool is correctly positioned. The correct limit setting can be determined by such systems as a photo sensor or a microswitch, and corrective action taken manually or automatically based on the output of such a mechanical or optical sensor.

If the device is to be used in a splicer in a typical major processing laboratory, it may be appropriate to use a drive for the guide block element that is controlled by the sequence controller of the splicer. The drive can also be simultaneously used for moving the special tool for detaching the end of the film from the spool, as is shown in EP-OS 0,636,924. The guide block element can be situated so as to swivel, or move in a straight or linear guide.

It is therefore an object according to the present invention to provide a device for positioning the spool of a photographic film cartridge, the film being provided at its end with holes that interact with a catch located on the spool, wherein the detachment from or the attachment to the spool is possible only in a predetermined spool position, comprising a rotatable shaft adapted to interlockingly engage the spool to control an orientation thereof, and a member having a displaceable guide block, such that the member operatively engages the shaft, and reorients the shaft into the predetermined position during a displacement of the guide block.

It is a further object according to the present invention to provide a device having a shaft linked by a flange, having at least one eccentrically attached positioning member.

It is a still further object according to the present invention to provide a device having a guide block shaped like a fork, i.e., having a concave recess between two elongated portions.

It is a another object according to the present invention to provide a device having a fork-shaped guide block having an concave tapering mouth of the recess, forming an insertion funnel.

It is a further object according to the present invention to provide a device having a shaft with two flattened surfaces positioned opposite to each other.

It is a still further object according to the present invention to provide a device wherein the guide block has a predetermined position limit and a sensor for determining whether the guide block is at its position limit. The sensor may be, for example, a mechanical switch, such as a Microswitch, or an optical sensor, such as a photo-interrupt sensor.

It is a further object according to the present invention to provide a device having a drive mechanism for displacing the guide block. The guide block may, for example, travel by sliding on a flat track or groove. The drive mechanism may be, for example, a pneumatic cylinder.

It is a further object according to the present invention to provide a device for detachment or attachment of the film in the cartridge comprising an insertable tool linked to the drive for the guide block.

These and other objects and features of the present invention will become more fully apparent from the following description and appended claims taken in conjunction with the accompanying drawings, in which like numerals refer to like parts.

BRIEF DESCRIPTION OF THE DRAWINGS

FIGS. 1A–1C show a first embodiment according to the present invention, in which FIG. 1A shows the shaft in a disoriented position, FIG. 1B shows the shaft in a desired orientation, with a first degree of guide block displacement, and triggering a mechanical sensor, and FIG. 1C shows the shaft in a position 180° from a desired orientation, with a second degree of guide block displacement, and not triggering a mechanical sensor;

FIGS. 2A–2C show a second embodiment according to the present invention, in which FIG. 2A shows the shaft in a disoriented position, FIG. 2B shows the shaft in a desired orientation and triggering a mechanical sensor, and FIG. 2C shows the shaft in a position 180° from a desired orientation and not triggering a mechanical sensor; and FIGS. 3A–3C show a third embodiment according to the present invention, in which FIG. 3A shows the shaft in a disoriented position, FIG. 3B shows the shaft in a desired orientation and triggering a mechanical sensor, and FIG. 3C shows the shaft in a position 180° from a desired orientation and not triggering a mechanical sensor.

DETAILED DESCRIPTION OF THE PREFERRED EMBODIMENTS

Figure 1A:
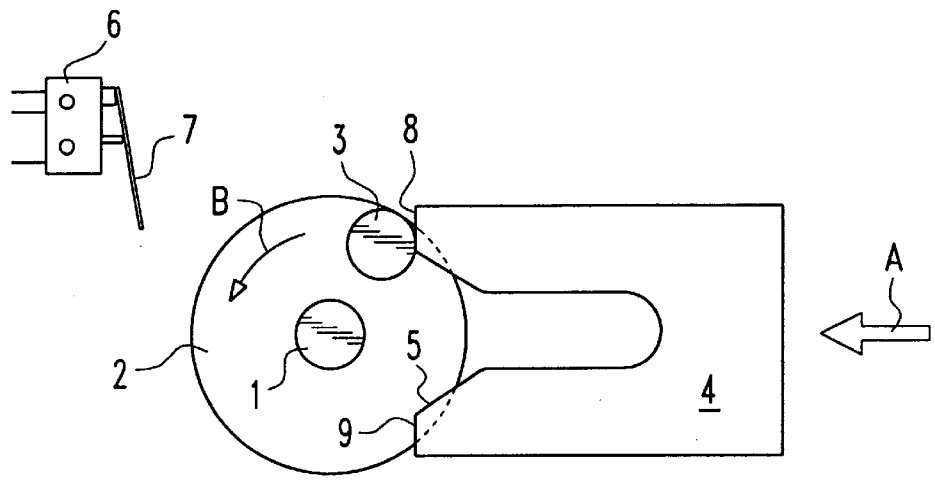

The invention will now be described by way of the drawings, in which corresponding reference numerals indicate corresponding structures in the figures.

EXAMPLE 1

Figure 1B:
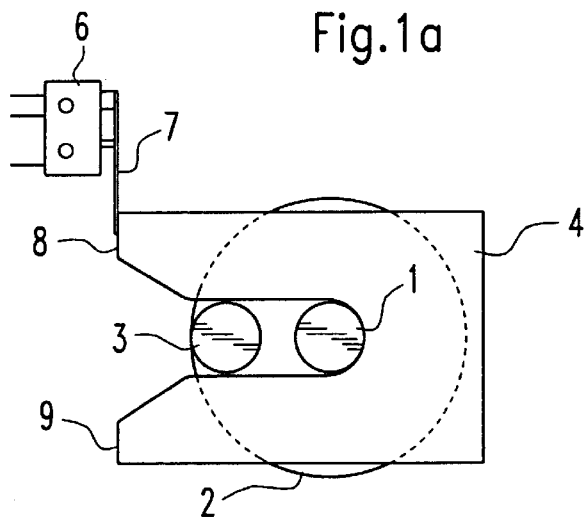
Figure 1C:
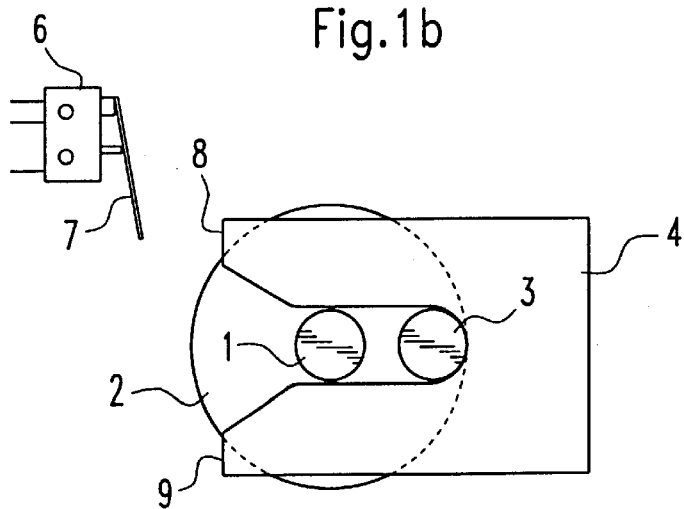

In a first embodiment shown in FIGS. 1A–1C, a flange or disk 2 is attached with a fixed rotational orientation with respect to the shaft 1. The shaft 1 has an undetermined initial position. The shaft 1 is interconnected with the film spool, so that the two are rotationally linked. The initial position of the shaft thus corresponds to the initial position of the spool. This interconnection between the shaft 1 and spool is not shown in the drawings, and such film spool drive devices are known in the art. A pin 3, which serves as a postioning member, is attached in an eccentric fashion with respect to the shaft 1, on disk 2.

Additionally, a fork-shaped guide block 4 is provided. By means of a drive, not depicted in the drawings, this guide block 4 can be slid in the direction of arrow A along track 10. On its open end, guide block 4 exhibits a funnel-shaped concave tapering mouth formed by mutually inclined butting faces 5. The closed end of the guide block 4 is configured as a semicircle so that shaft 1 is admitted in a defined position.

An electrical switch 6, e.g., a microswitch, includes a switching lever 7 that is activated by the switching surface 8 of guide block 4.

After film is uncoiled from a cartridge, shaft 1, which is rotationally linked with the spool, remains in position. This position must partially match that position which is necessary to be able to detach the end of the film from the spool. One of these possible settings is shown in FIG. 1A. To bring shaft 1 into the prescribed position, guide block 4 is moved in the direction of arrow A. A force is thereby exerted by the switching surface 8 of guide block 4 on positioning member or pin 3. This force moves pin 3 in a direction that causes disk 2 to turn in the direction of arrow B. During this rotation, pin 3 first moves upward and then downward, until it comes in contact with the inclined butting face 5 of guide block 4. Pin 3 is then pressed into a position that is shown in FIG. 1B by the displacement of the inclined butting face 5. Guide block 4 can then be moved far enough to the left so that switching surface 8 moves the control lever 7 of switch 6. By means of this switch 6, for example, the drive for guide block 4 can be shut off.

The positioning process proceeds in similarly if shaft 1 is caused to stop in a position in which pin 3 touches surface 9 of guide block 4. Only here, disk 2 is turned opposite to the direction of arrow B.

In the setting shown in FIG. 1B, the end of the film can be detached from the spool, and guide block 4 can be moved back into its initial position.

It is thus possible to do a precise correction of the shaft position in this embodiment. This is possible if, after uncoiling the film, the spool exhibits an attitude of $\pm 135°$ to that position in which the film can be optimally extracted from the spool. However, if the spool is in another position after uncoiling the film, then pin 3 will adjoin one of the inclined butting faces 5 of guide block 4. In this case, by inserting the guide block 4, the spool will be brought into a position that differs from the correct limit setting by 180°. This position is shown in FIG. 1C. Here, however, control lever 7 of switch 6 is not reached by the switching surface 8 in the limit setting of guide block 4. In this case, the drive for guide block 4 can be provided with a safety switch that switches the drive off if the resistance is appropriately large, e.g., exceeds a predetermined limit, without switch 6 being activated. In this condition an error message to the operating employee can be generated. Alternately or additionally, an automated correction system may be employed to correct the condition.

EXAMPLE 2

Figure 2A:
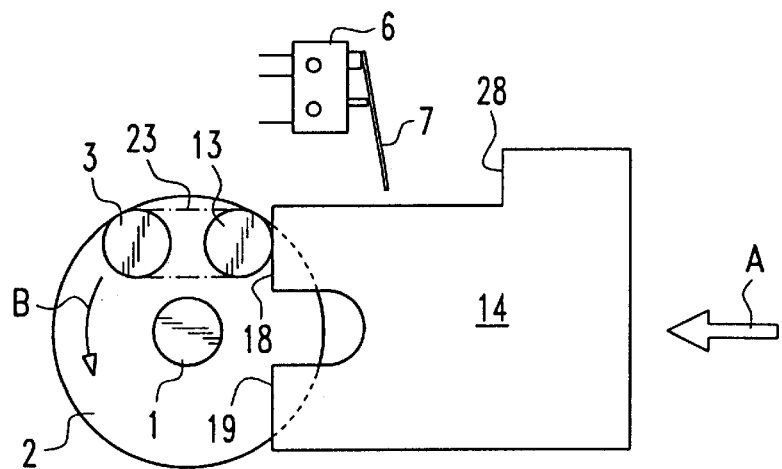
Figure 2B:
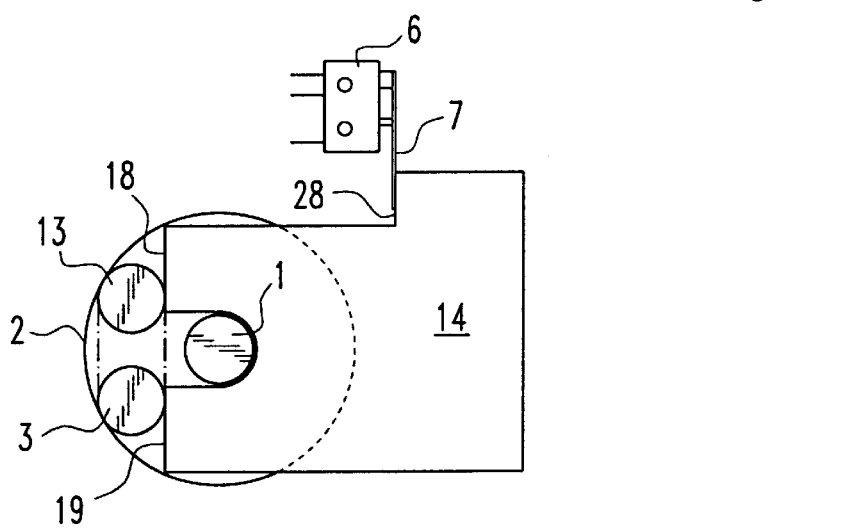
Figure 2C:
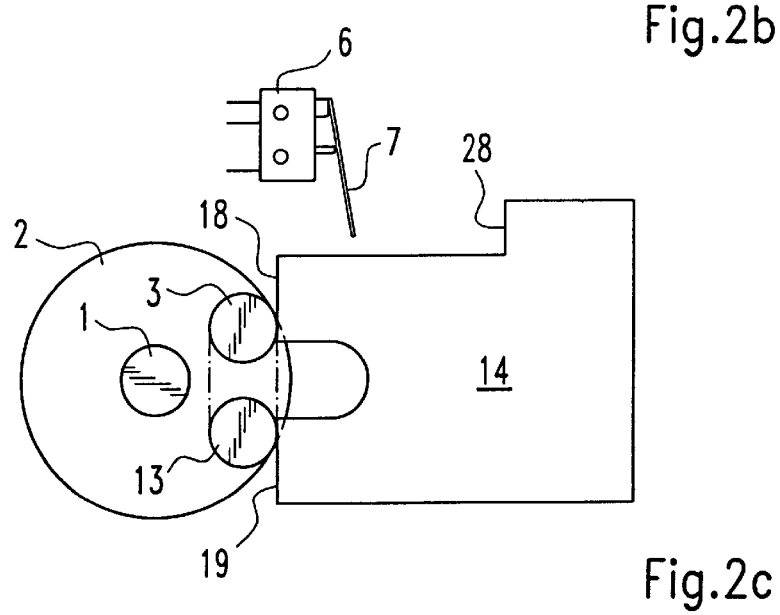

The embodiment shown in FIG. 2A–2C differs from the embodiment shown in FIG. 1A–1C by having an additional pin 13 on disk 2. Instead of the two pins 3 and 13, a single solid body 23, can also be used. The outlines of such a solid body 23 are indicated by the dashed and dotted line. Otherwise, identical parts are identified by the same reference numbers. If the two pins 3 and 13 or body 14 are used, then the two inclined butting faces 5 of guide block 4 in FIG. 1 can be eliminated, resulting in a guide block 14 configured as shown with parallel faces and a recess therebetween. The positioning member may thus assume various configurations. Therefore, in this case, surfaces 18 and 19 can be designed larger, and can assume the task of position adjustment as well as holding a position. The position limit is fixed if the two pins 3 and 13 touch surfaces 18 and 19. Alternately, it is fixed if guide block 14 adjoins surfaces 18, 19 with its straight inner edge. The switch 6 acts in exactly the same way as in the first embodiment. Here, however, it is activated by an extra switching surface 28. The angular range which can be corrected by this device is somewhat larger than in the first embodiment shown in FIGS. 1A–1C.

EXAMPLE 3

Figure 3A:
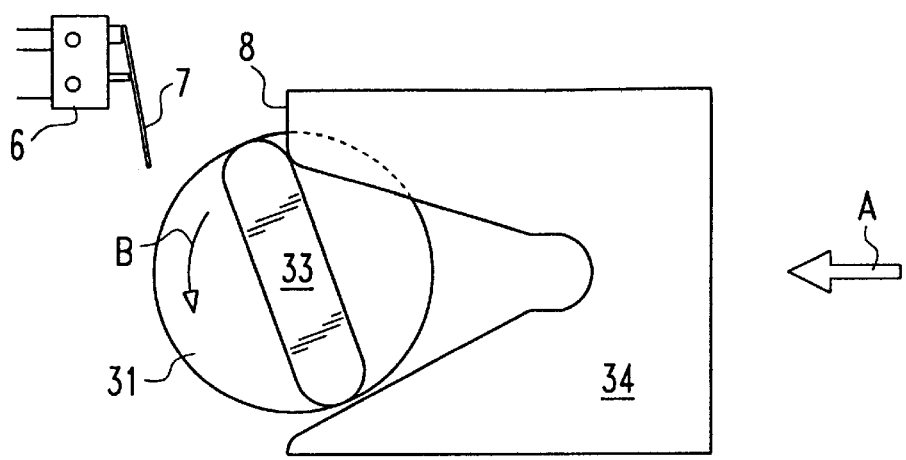
Figure 3B:
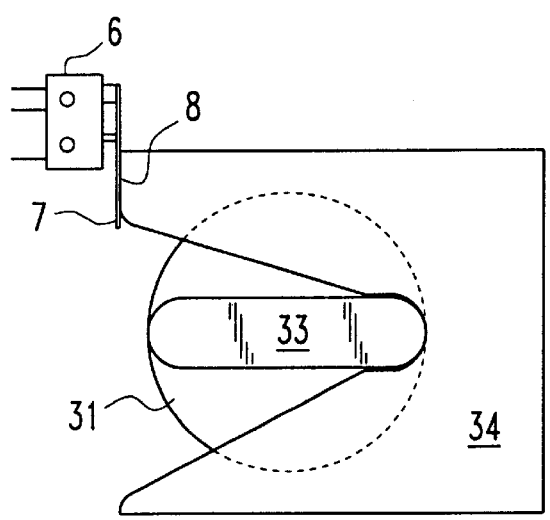
Figure 3C:
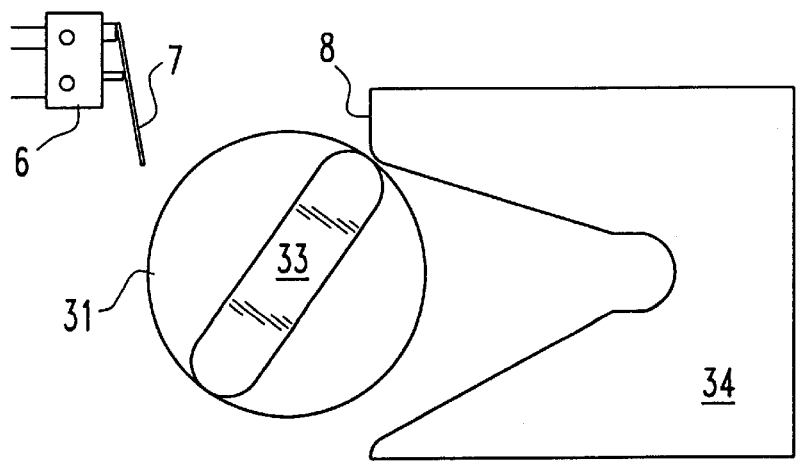

In the third embodiment, shown in FIG. 3A–3C, no additional disk attached to the axle is needed, as in the first and second embodiments according to FIGS. 1A–1C and 2A–2C, respectively. Here, shaft 31 is recessed in such a way that a flattened surface 33 is formed. The cross section of this flattened surface includes a rectangular portion with semicircular-shaped surfaces on its narrow sides forming the postioning member.

The guide block 34 here includes only the one vertical surface 8, by which simultaneously the position of shaft 1 can be corrected and switch 6 can be operated.

This is a very simple embodiment example that requires no additional disk with an eccentric pin. This embodiment is advantageously employed particularly if the final attained position of the shaft is only to be corrected in one direction. For example if, in uncoiling the film, the spool must be overwound by a certain amount, this results in the condition that the spool must be rotated back somewhat in order to correct its position. For this, surface 8 of block 34 contacts the flattened surface 33 of shaft 31, and rotates it in the direction of arrow B. In the setting limit shown in FIG. 3B, the shaft 31 again is fixed in its position, and switch 6 is actuated. If the shaft position needed to be corrected in the opposite direction, as is indicated in the configuration shown in FIG. 3C, then the result would be a jam, and switch 6 would not be actuated. In this case again, as already described for FIG. 1C, the drive would be switched off by a safety switch, and an error message to that effect would be generated. As above, the error condition may be manually or automatically corrected.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims.

What is claimed is:

1. A device for positioning a spool of a photographic film cartridge, the film being provided with holes at its end which interact with a catch attached to the spool, whereby the detachment from or the attachment to the spool is possible only in a particular predetermined rotational spool position, comprising:

a bidirectionally rotatable shaft having an axis of rotation, being interlockingly engagable to the spool so that said shaft and the spool have a predetermined rotational orientation;

a positioning member attached for rotation with said rotatable shaft rotation being structured for rotationally repositioning said rotatable shaft by translating an applied force to the postioning member into a torque on said shaft about said axis of rotation; and a guide block, being structured to gradually engage and apply said force to said positioning member positioned eccentrically to said axis of rotation, during a linear displacement of said guide block in a first direction, wherein said shaft and the spool have said predetermined rotational spool position resulting from complete displacement of said guide block in said first direction to a limit position, and said guide block being structured to release engagement of said positioning member during a linear movement in a second direction, said first and second directions being opposite from each other.

2. The device according to claim 1, further comprising means for linearly displacing said guide block with respect to said positioning member, wherein said guide block directly reorients said shaft during said linear displacement of said guide block.

3. The device according to claim 1, wherein said guide block has a fork-shaped end adapted to selectively engage said positioning member during linear displacement of said guide block with respect to said positioning member.

4. The device according to claim 3, wherein said fork-shaped end comprises a concave tapering recess, said concave tapering recess selectively engaging and gradually displacing said positioning member.

5. The device according to claim 1, further comprising a limit switch for sensing when said guide block is in said linear displacement limit position.

6. The device according to claim 5, wherein said limit switch comprises a mechanical switch.

7. The device according to claim 1, further comprising a drive mechanism for linearly displacing said guide block.

8. The device according to claim 7, further comprising a flat track for guiding a sliding linear displacement of said guide block by said drive mechanism.

9. A device for positioning a spool of a photographic film cartridge, the spool being provided with holes at its end which interact with a catch attached to the spool, whereby the detachment from or the attachment to the spool is possible only in a particular predetermined rotational spool position, comprising:

a rotatable shaft, having an rotational axis, being interlockingly engagable to the spool so that said shaft and the spool have a predetermined rotational orientation;

a flange, attached for rotation with said shaft, having at least one positioning member on said flange, said postioning member having a portion disposed eccentrically with respect to said axis, said positioning member being structured to translate a force applied to said positioning member along an axis normal to said axis into a rotational torque on said shaft about said axis; and a displaceable guide block, having a first position wherein said displaceable guide block does not engage said positioning member and said shaft is rotationally unconstrained by said guide block, and a second position wherein said displaceable guide block engages said positioning member, and said guide block is structured to rotationally constrain said positioning member to a predetermined orientation corresponding to a predetermined rotational spool position, said guide block applying said force to said positioning member during a transition from said first position to said second position, a direction of said torque being related to a relation between a position of said positioning member and said predetermined position during said transition, said guide block selectively engaging and reorienting said shaft about said axis through a shortest path into the predetermined rotational spool position.

10. A device for positioning a spool of a photographic film cartridge, the film being provided with holes at its end which interact with a catch attached to the spool, whereby the detachment from or the attachment to the spool is possible only in a particular predetermined rotational spool position, comprising:

a freely rotatable shaft, having an axis of rotation, being interlockingly engagable to the spool so that said shaft and the spool have a predetermined rotational orientation;

a positioning member attached for rotation with said shaft and having an eccentrically disposed portion with respect to said axis of said freely rotatable shaft, and being structured for bidirectionally rotating said freely rotatable shaft in response to a force applied to said positioning member, said eccentric disposition of said portion with respect to said axis of said freely rotatable shaft translating said force into a torque on said shaft about said axis; and a displaceable guide block, being operative for selectively and releasably engaging said positioning member and applying said force thereto during a displacement of said guide block with respect to said positioning member from a first position to a second position, said positioning member and freely rotatable shaft being unconstrained by said guide block in said first position, and said guide block structured to rotationally constrain said positioning member and freely rotatable shaft to said predetermined rotational spool position in said second position, a direction of said torque being dependent on a relative rotational position of said positioning member and said guide block while in said first position, a net torque being zero when said shaft is in said predetermined rotational spool position, thereby reorienting said freely rotatable shaft from a misaligned position into the predetermined rotational spool position along a shortest path.

11. The device according to claim 10, wherein said guide block is adapted for selectively engaging said positioning member in at least two different orientations thereof, a correctly oriented state associated with a first degree of guide block displacement and an incorrectly oriented state, associated with a second degree of displacement, further comprising a sensor for selectively detecting at least one of said first and second degrees of displacement.

12. The device according to claim 11, wherein said guide block has a central recess having inwardly tapering walls adapted to gradually engage said positioning member during displacement of said guide block toward said positioning member.

13. The device according to claim 11, wherein said guide block engages said positioning member in at least two orientations, a correctly oriented state associated with a first degree of guide block displacement and an incorrectly oriented state, associated with a second degree of displacement, further comprising a sensor for selectively detecting at least one of said first and second degrees of displacement.

14. The device according to claim 10, wherein said guide block has a fork-shaped end adapted to selectively engage said positioning member during relative displacement therebetween.

15. The device according to claim 14, wherein said fork-shaped end comprises a concave tapering recess, said concave tapering recess selectively engaging and gradually aligning said positioning member.

16. The device according to claim 10 further comprising a limit switch for sensing when said guide block is in a limit position.

17. The device according to claim 10, further comprising a flat track for guiding a linear displacement of said guide block.

18. The device according to claim 10, further comprising means for displacing said guide block from said first position to said second position, wherein said guide block directly reorients said shaft from a misaligned position while said guide block is in said first position, to the predetermined rotational spool position while said guide block is displaced to said second position.

* * * * *